US011743344B1

(12) United States Patent
Sivaswamy et al.

(10) Patent No.: US 11,743,344 B1
(45) Date of Patent: Aug. 29, 2023

(54) EDGE RESOURCE PROCESSING

(71) Applicant: INTERNATIONAL BUSINESS MACHINES CORPORATION, Armonk, NY (US)

(72) Inventors: Hemant Kumar Sivaswamy, Pune (IN); Sri Harsha Varada, Vizianagaram (IN); Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/654,826

(22) Filed: Mar. 15, 2022

(51) Int. Cl.
*H04L 67/289* (2022.01)
*H04L 67/61* (2022.01)

(52) U.S. Cl.
CPC ............ *H04L 67/289* (2013.01); *H04L 67/61* (2022.05)

(58) Field of Classification Search
CPC .............................. H04L 67/289; H04L 67/61
See application file for complete search history.

(56) References Cited

U.S. PATENT DOCUMENTS

| 9,824,595 | B1* | 11/2017 | Pate | G07C 5/0808 |
|---|---|---|---|---|
| 10,114,000 | B1* | 10/2018 | Lewis | G01N 33/28 |
| 11,487,017 | B2* | 11/2022 | Moore | G01S 7/417 |
| 2014/0361928 | A1* | 12/2014 | Hughes | G01S 5/0221 |
| | | | | 342/463 |
| 2014/0372498 | A1* | 12/2014 | Mian | B61L 25/028 |
| | | | | 709/201 |
| 2017/0195823 | A1* | 7/2017 | Shinohara | H04W 4/70 |
| 2017/0301220 | A1* | 10/2017 | Jarrell | G05D 1/0022 |
| 2018/0198641 | A1* | 7/2018 | Gilani | H04L 63/1425 |
| 2021/0117860 | A1* | 4/2021 | Ergen | G06N 20/00 |

(Continued)

FOREIGN PATENT DOCUMENTS

| CN | 110417605 A | 11/2019 |
|---|---|---|
| WO | 2020190764 A1 | 9/2020 |

OTHER PUBLICATIONS

Disclosed Anonymously, "Context aware priority-based object recognition, tracking, analyzing in edge computing ecosystem", https://priorart.ip.com/IPCOM/000262496, IPCOM000262496D, Jun. 7, 2020, pp. 1-5.

(Continued)

*Primary Examiner* — Dhairya A Patel
(74) *Attorney, Agent, or Firm* — Tihon Poltavets (57) ABSTRACT

A method for managing edge resource processing includes identifying a plurality of data sources, wherein each sensor from a plurality of sensors associated with the plurality of data sources produce data for processing by a plurality of edge devices. In response to sampling a data feed from each data source form the plurality of data sources to establish context, the method also includes determining contextual priority for each data source. The method also includes identifying the plurality of edge devices at the location for performing computations on the data produced by the plurality of data sources. In response to identifying a type of computation for the plurality of edge devices, the method also includes determining a computation plan for the edge devices based on the contextual priority for each data source from the plurality of data sources and deploying the computation plan for the plurality of edge devices.

18 Claims, 6 Drawing Sheets

(56) References Cited

U.S. PATENT DOCUMENTS

2021/0302621 A1* 9/2021 Brown .................... G01W 1/10
2021/0397175 A1* 12/2021 Tsutsumi ................. G01D 3/08
2022/0353599 A1* 11/2022 Chen .................... H04R 1/1041

OTHER PUBLICATIONS

Disclosed Anonymously, "Edge Computing: Dynamic Priority-Based Device Selection, Reassignment and Rescheduling", https://priorart.ip.com/IPCOM/000266589, IPCOM00266589D, Jul. 30, 2021, pp. 1-5.

Mell et al., "The NIST Definition of Cloud Computing", National Institute of Standards and Technology, Special Publication 800-145, Sep. 2011, pp. 1-7.

Chekired et al., "Industrial IoT Data Scheduling Based on Hierarchical Fog Computing: A Key for Enabling Smart Factory", IEEE Transactions on Industrial Informatics, vol. 14, No. 10, pp. 4590-4602, Oct. 2018, https://ieeexplore.ieee.org/abstract/document/8371624, 14 pages.

International Searching Authority, "International Search Report and Written Opinion of the International Searching Authority", International Application No. PCT/EP2023/056359, dated Jun. 22, 2023, 14 pages.

Sivaswamy et al., "Edge Resource Processing", International Application No. PCT/EP2023/056359, International Filing Date Mar. 13, 2023, 31 pages.

Tocze et al., "ORCH: Distributed Orchestration Framework using Mobile Edge Devices", 2019 IEEE 3rd International Conference on Fog and Edge Computing (ICFEC), 2019, https://ieeexplore.ieee.org/document/8733152, 10 pages.

* cited by examiner

EDGE RESOURCE PROCESSING

BACKGROUND

This disclosure relates generally to edge computing, and in particular to managing edge resource processing in an edge computing environment.

Edge computing is a distributed computing framework that brings computation and data storage to a local level, closer to sources of data. Sources of data include Internet of Things (IoT) devices or local edge servers. Utilizing these sources of data allows for increased response times and decreased bandwidth with edge computing, since the computing and storing occurs at a local level rather than on a remote server. The ongoing introduction of 5G networks is increasing the number of connected devices available for edge computing and increasing the amount of computations and data storage occurring at the local level.

SUMMARY

Embodiments in accordance with the present invention disclose a method, computer program product and computer system for managing edge resource processing, the method, computer program product and computer system can identify a plurality of data sources at a location, wherein each sensor from a plurality of sensors associated with the plurality of data sources produce data for processing by a plurality of edge devices. The method, computer program product and computer system can, responsive to sampling a data feed from each data source form the plurality of data sources to establish context, determine contextual priority for each data source from the plurality of data sources. The method, computer program product and computer system can identify the plurality of edge devices at the location for performing computations on the data produced by the plurality of data sources. The method, computer program product and computer system can, responsive to identifying a type of computation for the plurality of edge devices, determine a computation plan for the edge devices based on the contextual priority for each data source from the plurality of data sources. The method, computer program product and computer system can deploy the computation plan for the plurality of edge devices.

DETAILED DESCRIPTION

Embodiments of the present invention manage edge resource processing for various data sources at a location by identifying the various data sources at the location, such as, a manufacturing facility or an infrastructure site and identifying distances between each of the various data sources. Embodiments of the present invention sample a data feed from each data source to establish context and determine contextual priority for each data source with respect to data processing by edge devices (i.e., edge resources). Embodiments of the present invention identify available edge devices at the location and identify a type of computation for the edge devices based on the context and the contextual priority for each of the various data sources. Embodiments of the present invention determine a computation plan for the available edge devices based on the contextual priority and historical context from previously deployed edge devices. The computation plan dictates where each edge device is to relocate and a type of data processing for each of the data sources. Embodiments of the present invention deploy each of the edge devices at the location to each of the various data sources for data processing. Improvements to technology include accelerating data processing through edge computing by integrating contextual priority and historical context to perform computations on data in series, parallel, or a varying degree of series and parallel, based on priority for the data values being produced by each data source.

Figure 1:
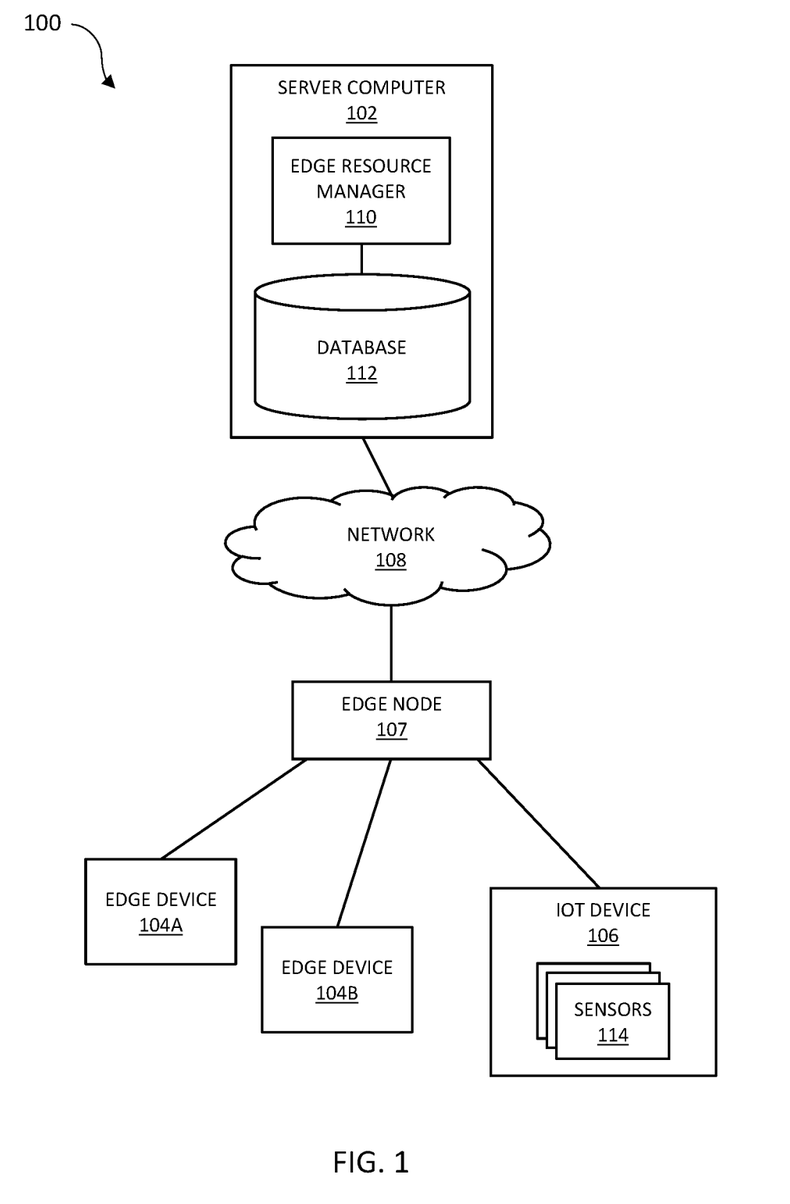
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, edge device 104A, edge device 104B, and Internet of Things (IoT) device 106 all interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, or any programmable electronic device capable of communicating with edge device 104A, edge device 104B, IoT device 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes edge resource manager 110 and database 112. Server computer 102 may include internal and external hardware components, as depicted and described in further detail with respect to FIG. 4.

Edge device 104A and 104B represent an electronic device capable of performing local computations in parallel, series, or a varying degree of parallel and series based on data received from sensors 114 on IoT device 106. Edge device 104A and 104B allow for the computation to occur locally rather than being sent to a remote server (e.g., server computer 102), resulting in quicker processing by relying on edge node 107 rather than network 108. Edge device 104A and 104B can send data (e.g., computation results) to server computer 102 through edge node 107 via network 108. Examples of edge node 107 can include routers, routing switches, integrated access devices (IADs), multiplexers, and a variety of metropolitan area network (MAN) and wide area network (WAN) access devices. IoT device 106 represent an electronic device connected to network 108 capable of exchanging data with other devices (e.g., server computer 102) via network 108 and other devices through edge node 107 (e.g., edge device 104A and 104B). IoT device 106 includes various sensors 114 for collecting and sending data to edge devices 104A and 104B for computation via edge node 107. IoT devices 106 can include but not limited to appliances, home security systems, health monitoring devices, factory equipment, wireless inventory trackers, biometric security scanners, and any other electronic device embedded with sensors and software for connecting and exchanging data with other devices and systems over a network (i.e., network 108 and edge node 107).

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, edge device 104A and 104B, IoT device 106, and other computing devices (not shown) within the distributed data processing environment.

Edge resource manager 110 manages edge device 104A and 104B data processing by identifying data sources (i.e., IoT device 106) at a location, such as, a power plant, a water treatment plant, or manufacturing facility. Edge resource manager 110 identifies distances between data sources at the location and samples IoT data feed from each data source to establish context for the data being collected. Edge resource manager 110 determines contextual priority for the data sources based on the established context for the data being collected and identifies edge devices (e.g., edge device 104A and 104B) for performing the computations. Edge resource manager 110 identifies a type of computation for edge device 104A and 104B, where the type of computation can include parallel, series, or a varying degree of parallel processing. Based on the identified type of computation for edge device 104A and 104B, edge resource manager 110 determines a computation plan and deploys the computation plan for edge device 104A and 104B. Deploying of the computation plan can include instructing edge device 104A to 104B to relocate to a specified area at the location and perform the computations for the data sources in parallel, series, or a varying degree of parallel.

Database 112 is a repository that stores various data including operational data for edge device 104A and 104B, operational data from sensors 114 from IoT device 106, and any other data pertinent to edge resource manager 110 for managing edge resource processing. In the depicted embodiment, database 112 resides on server computer 102. In another embodiment, database 112 elsewhere within the distributed data processing environment provided edge resource manager 110 has access to database 112. A database is an organized collection of data, where database 112 can be implemented with any type of storage device capable of storing data and configuration files that can be accessed and utilized by edge resource manager 110, such as a database server, a hard disk drive, or a flash memory.

Figure 2:
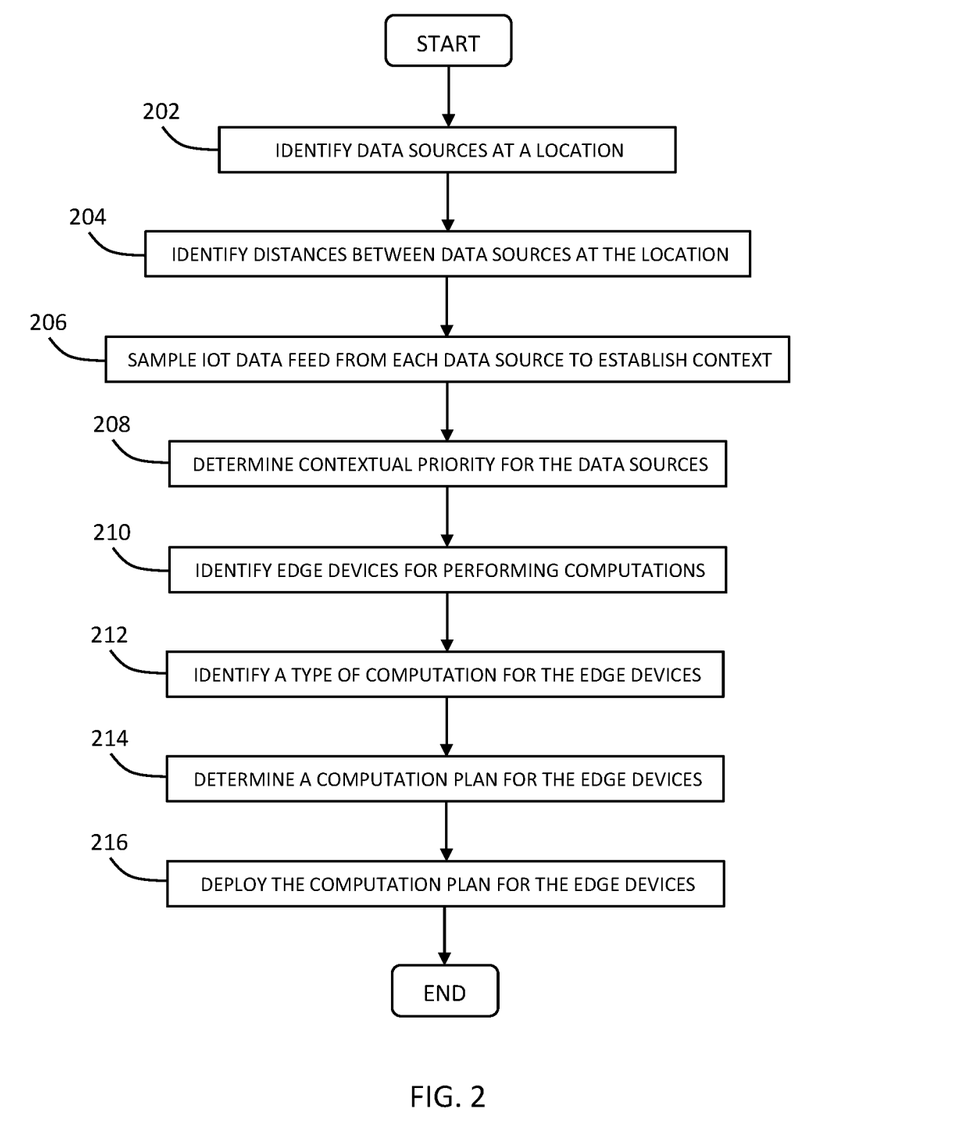
FIG. 2 depicts a flowchart for an edge resource manager program for managing edge device data processing, in accordance with an embodiment of the present invention.

FIG. 2 depicts a flowchart for an edge resource manager program for managing edge device data processing, in accordance with an embodiment of the present invention.

Edge resource manager 110 identifies data sources at a location (202). The data sources represent IoT devices with various sensors configured to produce operational data at the location. In one embodiment, edge resource manager 110 identifies data sources at a power plant that include various monitoring systems relating to pressure, temperature, volume, energy output, and resource input. Each of the various monitoring systems include sensors configured to produce operation data relating to pressure, temperature, volume (e.g., water flow, gas flow), energy output, and resource input. In another embodiment, edge resource manager 110 identifies data sources within a server room with multiple operational server racks that includes various monitoring system relating to fire, pressure, temperature, movement, seismic motion, and moisture. Each of the various monitoring systems include sensors configured to produce operation data relating fire (e.g., smoke detection), pressure, temperature, movement (e.g., motion of an individual in the server room), seismic motion (e.g., motion of server rack on the server room floor), and moisture (humidity levels).

Edge resource manager 110 identifies distance between data sources at the location (204). Edge resource manager 110 identifies the distance between each monitoring system with sensors from the various monitoring systems through Global Positioning System (GPS), a wireless positioning system, and/or an indoor positioning system (IPS). For GPS, edge resource manager 110 determines GPS coordinates for each data sources and calculates distance between each data source. For a wireless positioning system, edge resource manager 110 utilizes an angle of arrival for a signal from each data source and/or Time of Flight (ToF) localization for each data source to identify a location and a distance between each data source. For an indoor positioning system, edge resource manager 110 utilizes a network of device to locate the data sources at the location and determine a distance between each data source. Edge resource manager 110 utilizes the distances between the data sources at the location for deploying and positioning edge devices when performing computations on the IoT data feed produced by the data sources.

Edge resource manager 110 samples IoT data feed from each data source to establish context (206). In one embodiment, edge resource manager 110 samples IoT data feed from each data source for a specific point in time to provide a snapshot for each data source at a location. With the snapshot of the IoT data feed from each data source, edge resource manager 110 identifies what data is being monitored and collected, along with any existing threshold values for the data resulting in a possible action (e.g., emergency shutdown). In other embodiments, edge resource manager 110 samples IoT data feed from each data source for a predetermined amount time and/or continuously over time, since a specific point in time might not provide an accurate representation of the data source and the IoT data feed being produced by the data source. For example, if a data source is partially operational between the hours of 10 pm and 5 am and fully operational between the hours of 5 am and 10 pm, edge resource manager 110 might not be able to sample IoT data feed from each data source at a specific point (e.g., 12:30 pm) compared to sample of IoT data feed for a predetermined amount of time, such as, 24 hours. It is to be noted, edge resource manager 110 can utilize a combination of embodiments relating to sampling the IoT data feed. For example, prior to the deployment of the edge devices, edge resource manager 110 samples the IoT data feed from each data source to establish context utilizing a snapshot and subsequent to the deployment of the edge devices, continuously samples the IoT data feed over time and adjusts the deployment of the edge devices accordingly.

In one example, edge resource manager 110 previous identified data sources at a power plant that included various monitoring systems relating to pressure, temperature, volume, energy output, and resource input. Edge resource manager 110 samples IoT data feed from each data source to establish context over a period of 24 hours, wherein the data sources include the various monitoring systems. Edge resource manager 110 samples the IoT data feed by receiving various data values for sensor positioned on each monitoring system relating to pressure, temperature, volume, energy output, and resource input. In another example, edge resource manager 110 previous identified data sources within a server room with multiple operational server racks that included various monitoring system relating to fire, pressure, temperature, movement, seismic motion, and moisture. Edge resource manager 110 samples IoT data feed from each data source to establish context during a predetermined period of time, where the predetermined period of time was an hour of peak power usage by the equipment in the server room (i.e., the multiple operational server racks). Edge resource manager 110 samples the IoT data feed by receiving various data values for sensor positioned on each monitoring system relating to fire, pressure, temperature, movement, seismic motion, and moisture.

Edge resource manager 110 determines contextual priority for the data sources (208). Edge resource manager 110 determines the contextual priority for the various data sources based on the sample IoT data feed for each data source. The contextual priority ranks the various data sources based on a level of urgency for data processing by the edge devices being deployed at the location based on a determine computation plan. For a data source with data values from various sensors exceeding a threshold or outside of a normal operating range resulting in a potentially dangerous situation to individuals or the environment, edge resource manager 110 can assign high contextual priority to that data source. For a data source with data values from various sensor exceeding a threshold or outside of a normal operating range resulting in high energy consumption with no inherent danger to individuals or the environment, edge resource manager 110 can assign low contextual priority to that data source compared to the data source with a potentially dangerous situation.

In one example, edge resource manager 110 previous identified data sources at a power plant that included various monitoring systems relating to pressure, temperature, volume, energy output, and resource input. Edge resource manager 110 sampled IoT data feed from each data source to establish context over a period of 24 hours, wherein the data sources include the various monitoring systems. Edge resource manager 110 sampled the IoT data feed by receiving various data values for sensor positioned on each monitoring system relating to pressure, temperature, volume, energy output, and resource input. Edge resource manager 110 determines contextual priority for the various monitoring systems relating to pressure, temperature, volume, energy output, and resource input. For a monitoring system relating to pressure, edge resource manager 110 determines a high contextual priority for the data source, since data values exceeding a threshold value or data values outside of an operating range is dangerous to the equipment and any individuals (e.g., plant worker) located in a vicinity to the equipment. For a monitoring system relating to temperature, edge resource manager 110 determines a high contextual priority for the data source due to potentially dangerous situations but lower priority compared to the monitoring system relating to pressure. For monitoring systems relating to volume and energy output, edge resource manager 110 determines a low contextual priority for the data sources due to no immediate danger for data values exceeding a threshold or data values outside of an operating range. Therefore, time for data processing is greater and edge resource manager 110 does not need to immediately deploy edge devices to resolve an issue with the monitoring systems relating to volume and energy output. For a monitoring system relating to resource input, edge resource manager 110 determines a medium contextual priority since data values exceeding a threshold or data values outside of an operating range can potentially result in a dangerous situation, if the data values for a monitoring system relating to pressure also exceed a threshold or are outside of an operational range.

In another example, edge resource manager 110 previous identified data sources within a server room with multiple operational server racks that included various monitoring system relating to fire, pressure, temperature, movement, seismic motion, and moisture. Edge resource manager 110 sampled IoT data feed from each data source to establish context during a predetermined period of time, where the predetermined period of time was an hour of peak power usage by the equipment in the server room (i.e., the multiple operational server racks). Edge resource manager 110 sampled the IoT data feed by receiving various data values for sensor positioned on each monitoring system relating to fire, pressure, temperature, movement, seismic motion, and moisture. For monitoring systems relating to fire and seismic motion, edge resource manager 110 determines a high contextual priority since data values exceeding a threshold or data values outside of an operating range can potentially result in a dangerous situation to an individual in the server room, to the equipment (i.e., multiple operational server racks) in the server room, and the data being stored on the equipment in the server room. For monitoring systems relating to pressure, temperature, and movement, edge resource manager 110 determines a low contextual priority since data values exceeding a threshold or data values outside of an operating range require attention and correction but do not pose immediate dangerous situations to individuals or the equipment in the server room. For a monitoring system relating to movement, edge resource manager 110 determines a medium contextual priority for data values exceeding a threshold or data values outside of an operating range can potentially result in a dangerous situation, if an intruder is present in the server room or if the data values for a monitoring system relating to seismic motion also exceed a threshold or are outside of an operational range.

Edge resource manager 110 identifies edge devices for performing computation (210). Edge resource manager 110 monitors edge devices for processing data at a location and identifies edge devices available for deployment to the various data sourced for performing computations, where the edge devices are located in a vicinity to the data sources.

The edge devices utilize edge nodes for communication and data processing to reduce an amount of time to perform computations compared to sending the data for processing over a network to a remote server. As previously mentioned, an edge device represents an electronic device capable of performing local computations in parallel, series, or a varying degree of parallel based on data received from sensors on each data source at a location. The edge device can be stationary or mobile, where edge resource manager 110 deploying a computation plan for the edge devices can include instructing a specific edge device to relocate to a location nearer to the data source. Edge resource manager 110 can also identify edge devices based on a storage availability, processing specifications, processing availability, connectivity specifications, and connectivity availability.

Edge resource manager 110 identifies a type of computation for the edge devices (212). Edge resource manager 110 identifies a type of computation for the edge devices from the listing consisting of series, parallel, and a varying degree of parallel processing. In one example, edge resource manager 110 previous identified data sources at a power plant that included various monitoring systems relating to pressure, temperature, volume, energy output, and resource input. Edge resource manager 110 also determined a high contextual priority for monitoring systems relating to pressure and temperature, a medium contextual priority for monitoring systems relating to resource input, and a low contextual priority for monitoring systems relating to volume and energy output. Edge resource manager 110 previously identified three edge devices for performing computations and based on the number of available edge devices and the number of data sources with high contextual priority, edge resource manager 110 identifies parallel processing is required for two of the three edge devices for performing computation relating to the data sources with high contextual priority. Edge resource manager 110 identifies a series processing is required for the third edge device for performing computations relating to the data sources with medium contextual priority and low contextual priority.

In another example, edge resource manager 110 previous identified data sources within a server room with multiple operational server racks that included various monitoring system relating to fire, pressure, temperature, movement, seismic motion, and moisture. Edge resource manager 110 also determined a high contextual priority for monitoring systems relating to fire and seismic motion, a medium contextual priority for monitoring systems relating to movement, and a low contextual priority for monitoring systems relating to pressure, temperature, and moisture. Edge resource manager 110 previously identified five edge devices for performing computations and based on the number of available edge devices and the number of data sources with high contextual priority, edge resource manager 110 identifies parallel processing is required for three out of the five edge devices for performing computation relating to the data sources with high contextual priority. Edge resource manager 110 identifies a varying degree of parallel processing is required for a fourth edge device for performing computation relating to the data sources with medium contextual priority and occasionally, computation relating to the data sources with high contextual priority if additional data processing is needed by three edge devices. Edge resource manager 110 identifies series processing is required for the fifth edge device for performing computations relating to the data sources with low contextual priority.

Edge resource manager 110 determines a computation plan for the edge devices (214). The computation plan dictates how each edge device from the available edge devices are to process data for the various data sources. In one example, edge resource manager 110 determines one aspect of the computation plan for the edge devices at a location includes instructing two of three available edge devices to relocate to data sources with previously identified high contextual priority, for data processing and instructing a third edge device to relocate between data sources with previously identified medium contextual priority and low contextual priority, for data processing. Edge resource manager 110 determines another aspect of the computation plan for the edge devices at the location includes instructing each of the three edge devices to perform the previously identified series, parallel, or a varying degree of parallel data processing for the various data sources. In another example, edge resource manager 110 determines one aspect of the computation plan for the edge devices at a location includes instructing three of five available edge devices to relocate to data sources with previously identified high contextual priority, for data processing. Edge resource manager 110 also determines a second aspect of the computation plan for the edge devices at the location includes instructing a fourth available edge device to relocate between data sources with previously identified high contextual priority and medium contextual priority, for data processing. Edge resource manager 110 also determines a third aspect of the computation plan for the edge devices at the location includes instructing a fifth edge device to relocate between data sources with previously identified medium contextual priority and low contextual priority, for data processing. Edge resource manager 110 determines a fourth aspect of the computation plan for the edge devices at the location includes instructing each of the five edge devices to perform the previously identified series, parallel, or a varying degree of parallel data processing for the various data sources.

Edge resource manager 110 deploys the computation plan for the edge devices (216). Edge resource manager 110 deploys the computation plan for the edge devices by instructing each edge device to perform each aspect of the computation plan. In one embodiment, edge resource manager 110 instructs an edge device to relocate to a location between two data sources, where a first data source includes high contextual priority data values, and a second data source includes medium contextual priority data values. Subsequent to receiving confirmation from the edge device regarding the relocation between the first data source and the second data source, edge resource manager 110 instructs the edge device to process data from the first data source with a varying degree of parallel processing with data from the second data source. If data values from the second data resource exceed a threshold or are outside of an operational range, edge resource manager 110 instructs the edge device to process the data from the first data source and the second data source in parallel. However, if data values from the second data resource are below a threshold or are within an operational range, edge resource manager 110 instructs the edge device to process the data from the first data source and the second data source in series, with the high contextual priority data values taking priority over the medium contextual priority data values. In another embodiment, edge resource manager 110 instructs an edge device to relocate to a location of a first data source, where the data source includes high contextual priority data values. Subsequent to receiving confirmation from the edge device regarding the relocation between the data source, edge resource manager 110 instructs the edge device to process data from the data source in series. In yet another embodiment, edge resource manager 110 instructs an edge device to relocate to a location between two data sources, where a first data source and a second data source each include high contextual priority data values. Subsequent to receiving confirmation from the edge device has relocated between the first data source and the second data source, edge resource manager 110 instructs the edge device to process data from the first data source and the second data source in parallel.

Embodiments of the present invention analyze contextual priority of edge computational needs and based on the contextual priority, determine a computation type for the edge computation performable by various devices. The computation types include serial (i.e., in series), parallel, or a varying degree of parallel processing. Embodiments of the present invention can re-position edge devices in the surrounding location, such that edge processing is performable as per the identified edge computational process (e.g., serial, parallel, varying degree of parallel processing). Embodiments of the present invention analyze the contextual priority of edge computing and identify how the datasets are to be distributed (e.g., same dataset can be split into multiple segments versus multiple datasets can be processed in parallel) among the edge devices so that, appropriate parallel processing can be performed by the edge devices. Embodiments of the present invention identify the physical location of the data sources and accordingly based on the edge processing needs, identify how the edge devices are to be physically placed at the location. As per the edge processing need, same data set (e.g., lookup) might be required for multiple datasets in edge computation, and accordingly the far edge devices can perform appropriate mobility so that required edge computing can be performed. Based on dynamic change in mode of edge computing process (e.g., serial, parallel, different degree of parallel processing), the proposed edge computing ecosystem can adjust the physical position or allocation of the edge devices in the said edge computing ecosystem.

Figure 3:
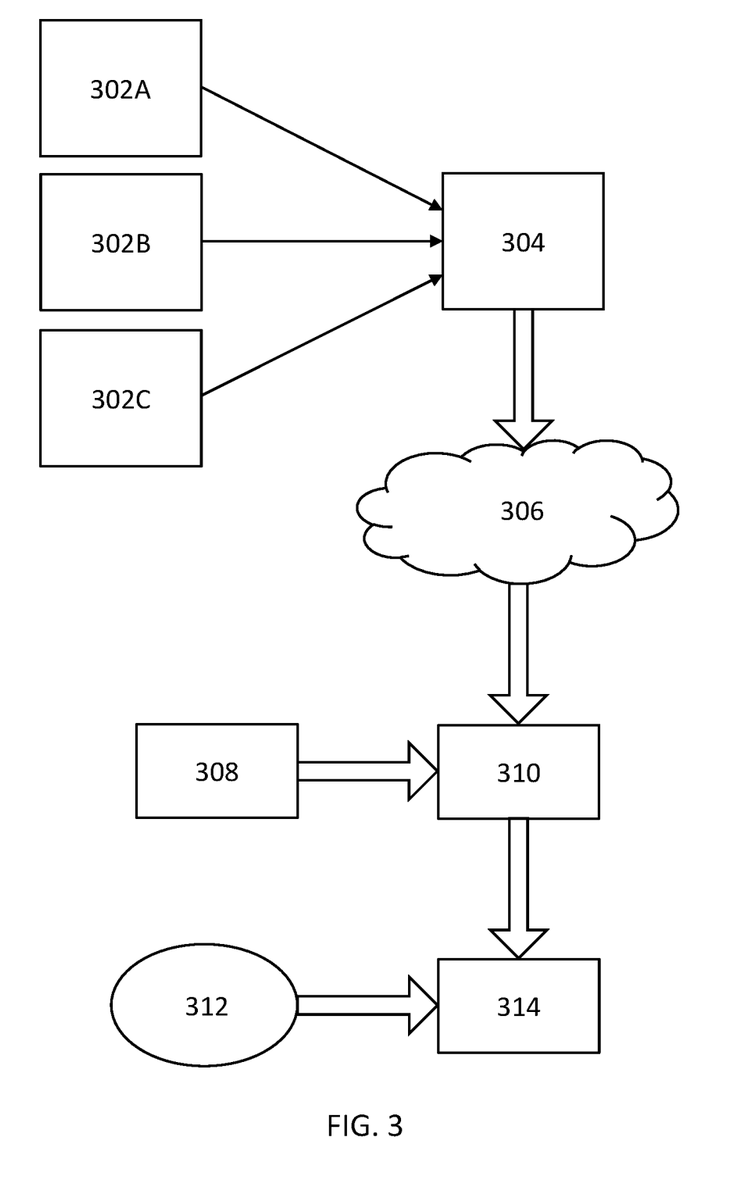
FIG. 3 depicts a process flow for an edge resource manager program for deploying edge devices based on historical context, in accordance with an embodiment of the present invention.

FIG. 3 depicts a process flow for an edge resource manager program for deploying edge devices based on historical context, in accordance with an embodiment of the present invention. In some embodiments, edge resource manager 110 utilizes historical context and a template for determining a computation plan for the edge devices performing data processing for the various data sources. In this illustrative flow example, edge resource manager 110 receives IoT data feed from various data source that include infrastructure monitoring systems 302A, industrial monitoring systems 302B, and agricultural monitoring systems 302C, where each of the monitoring systems represent different types of contextual situations where sensors and edges device are present in an edge computing ecosystem. At process 304, edge resource manager 110 determines historical context is performed by identifying how the sensors and edge devices are positioned at a location for data processing, types of contextual situations (i.e., 302A, 302B, and 302C), mobility of the edge device while performing computations, and different level of effectiveness of the edge computing. At cloud server 306, edge resource manager 110 creates a historical context awareness edge computing template for utilization in determining a computation plan for the edge device. At process 308, edge resource manager 110 identifies any edge computing needs for the various data sources and at process 310, edge resource manager 110 identifies appropriate template for the edge computing based on the historical context awareness edge computing templates. At process 312, edge resource manager 110 identifies available edge devices and at process 314, edge resource manager 110 identifies an appropriate position and direction of each edge device and sensors based on a selected historical context awareness edge computing template, for the computation plan for the edge devices.

Based on historically captured relative positions, directions of different sensors and edge devices for different contextual situation of edge computation, embodiments of the present invention can create templates which capture the relative positions, directions of the sensors, edge devices for different types of edge computational need. While the templates are created with different relative positions and direction of IoT sensors and edge devices, embodiments of the present invention can capture the context of edge computation (e.g., gas leak impact and remediation vs water leakage in any industrial floor). As a result, when similar context of edge computing is identified, embodiments of the present invention can identify how the sensors and edge devices are to be placed. Based on historically identified effectiveness of different edge computation for different context of edge computations, embodiments of the present invention can identify which template is appropriate for the identified contextual need of edge computation and can select an appropriate template. When any contextual need of edge computation is identified, embodiments of the present invention can identify an appropriate template, and the edge devices and IoT sensors are to be participating in edge computation while repositioning based on the identified template for edge and IoT device positioning. For similar types of edge computing, contextual situation can change from time to time, and accordingly based on change in contextual situation, embodiments of the present invention can enforce an appropriate template, and the sensors can reposition/readjust in the surrounding. Based on historical analysis of different edge computing decision, performance, embodiments of the present invention can calculate the effectiveness of edge computing, and accordingly identify the template which can provide better performance of edge computation.

Figure 4:
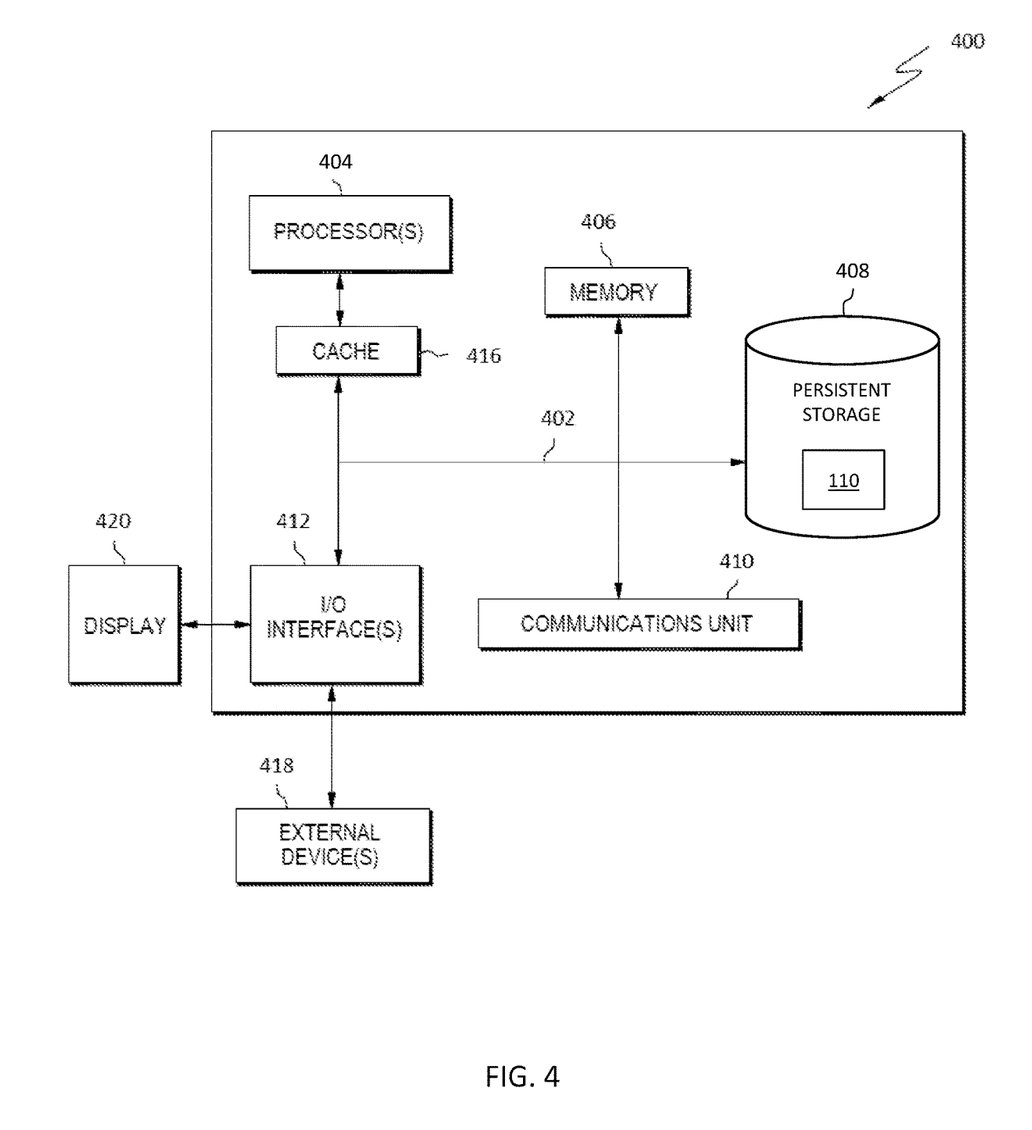
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes edge resource manager 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
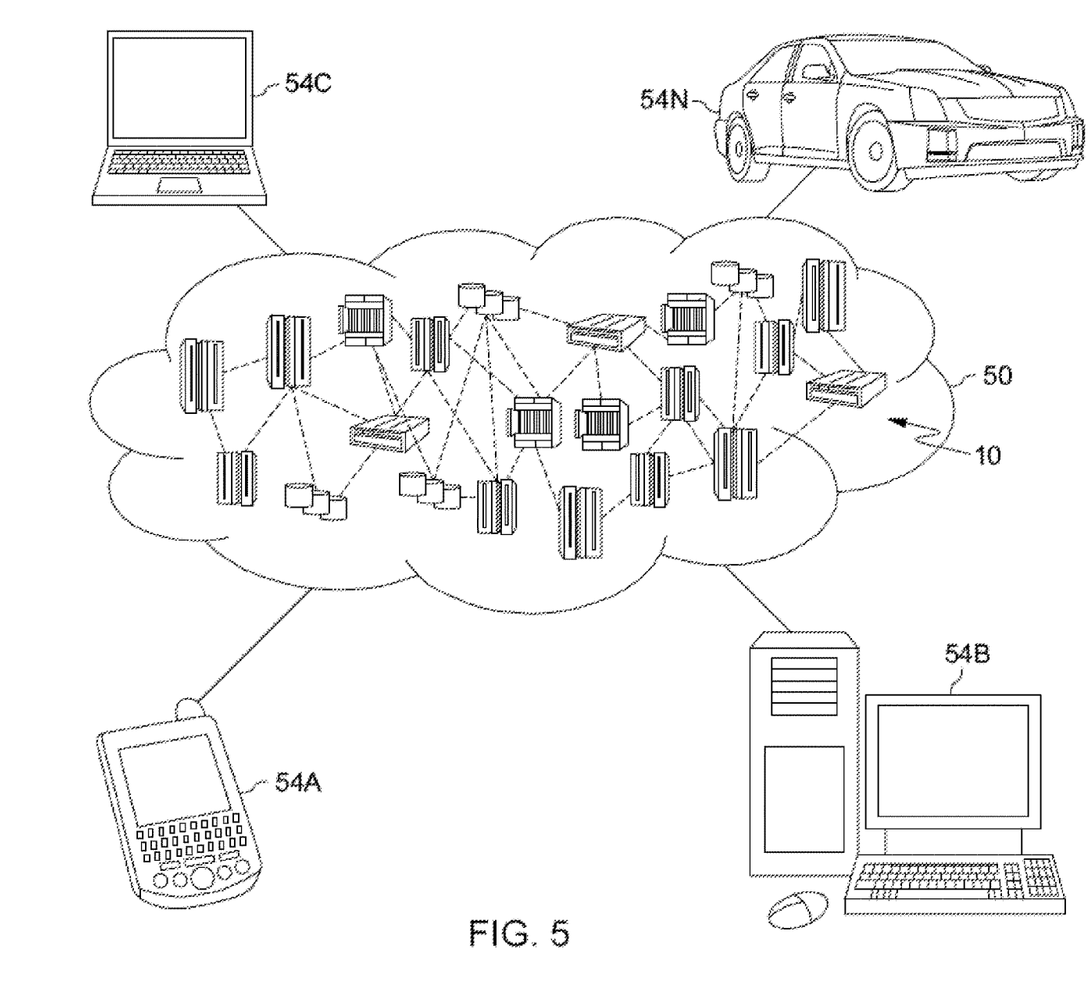
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
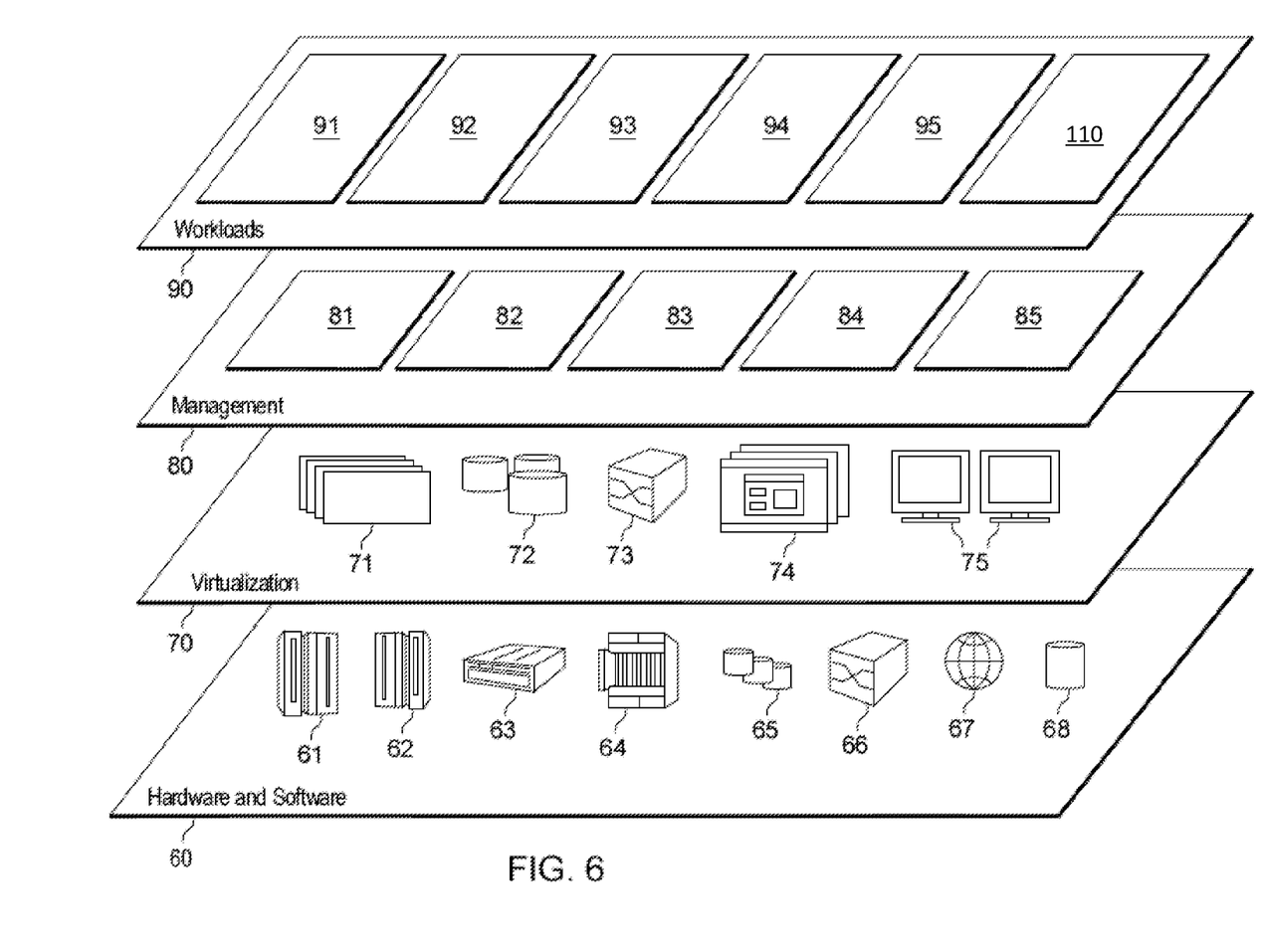
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge resource manager 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying a plurality of data sources at a location, wherein each sensor from a plurality of sensors associated with the plurality of data sources produce data for processing by a plurality of edge devices, wherein each data source from the plurality of data sources is an IoT device independent from each edge device from the plurality of edge devices;
    responsive to sampling a data feed from each data source form the plurality of data sources to establish context, determining contextual priority for each data source from the plurality of data sources;
    identifying the plurality of edge devices at the location for performing computations on the data produced by the plurality of data sources;
    responsive to identifying a type of computation for the plurality of edge devices, determining a computation plan for the edge devices based on the contextual priority for each data source from the plurality of data sources;
    deploying the computation plan for the plurality of edge devices; and
    instructing each edge device from the plurality of edge devices to relocate to a position based on a distance between each data source from the plurality of data sources at the location and based on the contextual priority for each data source from the plurality of data sources.

2. The computer-implemented method of claim 1, wherein the computation plan specifies a computation type for each edge device from the plurality of edge devices and the computation type is selected from the group consisting of: series processing, parallel processing, and a varying degree of parallel and series processing.

3. The computer-implemented method of claim 2, further comprising:
    identifying the distance between each data source from the plurality of data sources at the location, wherein the distance between each data source dictates a deployment location for each edge device from the plurality of edge devices.

4. The computer-implemented method of claim 3, further comprising:
    instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
    instructing the first edge device to perform a varying degree of parallel and series processing for the first data source and the second data source, wherein a first set of data values for the first data source exceed a first threshold value and a second set of data values do not exceed a second threshold value.

5. The computer-implemented method of claim 3, further comprising:
instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
instructing the first edge device to perform parallel processing for the first data source and the second data source.

6. The computer-implemented method of claim 5, wherein a first set of data values for the first data source exceed a first threshold value and a second set of data values for the second data source exceed a second threshold value.

7. A computer program product comprising one or more computer readable storage media and program instructions collectively stored on the one or more computer readable storage media, the stored program instructions executable by one or more computer processors, the stored program instructions comprising:
identifying a plurality of data sources at a location, wherein each sensor from a plurality of sensors associated with the plurality of data sources produce data for processing by a plurality of edge devices, wherein each data source from the plurality of data sources is an IoT device independent from each edge device from the plurality of edge devices;
responsive to sampling a data feed from each data source form the plurality of data sources to establish context, determining contextual priority for each data source from the plurality of data sources;
identifying the plurality of edge devices at the location for performing computations on the data produced by the plurality of data sources;
responsive to identifying a type of computation for the plurality of edge devices, determining a computation plan for the edge devices based on the contextual priority for each data source from the plurality of data sources;
deploying the computation plan for the plurality of edge devices; and
instructing each edge device from the plurality of edge devices to relocate to a position based on a distance between each data source from the plurality of data sources at the location and based on the contextual priority for each data source from the plurality of data sources.

8. The computer program product of claim 7, wherein the computation plan specifies a computation type for each edge device from the plurality of edge devices and the computation type is selected from the group consisting of: series processing, parallel processing, and a varying degree of parallel and series processing.

9. The computer program product of claim 8, the stored program instructions further comprising:
identifying the distance between each data source from the plurality of data sources at the location, wherein the distance between each data source dictates a deployment location for each edge device from the plurality of edge devices.

10. The computer program product of claim 9, the stored program instructions further comprising:
instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
instructing the first edge device to perform a varying degree of parallel and series processing for the first data source and the second data source, wherein a first set of data values for the first data source exceed a first threshold value and a second set of data values do not exceed a second threshold value.

11. The computer program product of claim 9, the stored program instructions further comprising:
instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
instructing the first edge device to perform parallel processing for the first data source and the second data source.

12. The computer program product of claim 11, wherein a first set of data values for the first data source exceed a first threshold value and a second set of data values for the second data source exceed a second threshold value.

13. A computer system comprising:
one or more computer processors;
one or more computer readable storage media; and
program instructions stored on the computer readable storage media for execution by at least one of the one or more computer processors, the program instructions comprising:
identifying a plurality of data sources at a location, wherein each sensor from a plurality of sensors associated with the plurality of data sources produce data for processing by a plurality of edge devices, wherein each data source from the plurality of data sources is an IoT device independent from each edge device from the plurality of edge devices;
responsive to sampling a data feed from each data source form the plurality of data sources to establish context, determining contextual priority for each data source from the plurality of data sources;
identifying the plurality of edge devices at the location for performing computations on the data produced by the plurality of data sources;
responsive to identifying a type of computation for the plurality of edge devices, determining a computation plan for the edge devices based on the contextual priority for each data source from the plurality of data sources;
deploying the computation plan for the plurality of edge devices; and
instructing each edge device from the plurality of edge devices to relocate to a position based on a distance between each data source from the plurality of data sources at the location and based on the contextual priority for each data source from the plurality of data sources.

14. The computer system of claim 13, wherein the computation plan specifies a computation type for each edge device from the plurality of edge devices and the computation type is selected from the group consisting of: series processing, parallel processing, and a varying degree of parallel and series processing.

15. The computer system of claim 14, the stored program instructions further comprising:
    identifying the distance between each data source from the plurality of data sources at the location, wherein the distance between each data source dictates a deployment location for each edge device from the plurality of edge devices.

16. The computer system of claim 15, the stored program instructions further comprising:
    instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
    instructing the first edge device to perform a varying degree of parallel and series processing for the first data source and the second data source, wherein a first set of data values for the first data source exceed a first threshold value and a second set of data values do not exceed a second threshold value.

17. The computer system of claim 15, the stored program instructions further comprising:
    instructing a first edge device from the plurality of edge devices to relocate to a position based on a first distance between a first data source from the plurality of data sources and a second data source from the plurality of data sources, wherein a first contextual priority of the first data source is greater than a second contextual priority of the second data source; and
    instructing the first edge device to perform parallel processing for the first data source and the second data source.

18. The computer system of claim 17, wherein a first set of data values for the first data source exceed a first threshold value and a second set of data values for the second data source exceed a second threshold value.

* * * * *